United States Patent
Gathmann et al.

(10) Patent No.: US 6,305,831 B1
(45) Date of Patent: Oct. 23, 2001

(54) APPARATUS FOR MIXING AND ADVANCING A POLYMER MELT

(75) Inventors: Egon Gathmann; Georg Stausberg; Klaus Schäfer, all of Remscheid; Friedel Dickmeiss, Eschweiler, all of (DE)

(73) Assignee: Barmag AG, Remscheid (DE)

( * ) Notice: Subject to any disclaimer, the term of this patent is extended or adjusted under 35 U.S.C. 154(b) by 0 days.

(21) Appl. No.: 09/561,471

(22) Filed: Apr. 28, 2000

Related U.S. Application Data

(63) Continuation of application No. PCT/EP99/06183, filed on Aug. 23, 1999.

(30) Foreign Application Priority Data

Aug. 29, 1998 (DE) .............................................. 198 39 489

(51) Int. Cl.⁷ ...................................................... B29B 7/10
(52) U.S. Cl. .............................. 366/79; 366/81; 366/91; 366/97; 366/325.2
(58) Field of Search ................................. 366/79, 80, 81, 366/82, 83, 97, 100, 293, 219, 325.2, 91; 425/200, 204, 208, 205

(56) References Cited

U.S. PATENT DOCUMENTS

| | | | |
|---|---|---|---|
| 2,653,351 | * | 9/1953 | Henning . |
| 3,035,304 | * | 5/1962 | Reifenhauser . |
| 3,175,248 | * | 3/1965 | Swenson . |
| 3,371,379 | * | 3/1968 | Reifenhauser . |
| 3,746,318 | * | 7/1973 | Schippers . |
| 3,751,015 | * | 8/1973 | Hensen et al. . |
| 3,924,842 | * | 12/1975 | Klein et al. . |
| 4,007,016 | | 2/1977 | Weber . |
| 4,128,342 | | 12/1978 | Renk . |
| 4,290,702 | * | 9/1981 | Klein et al. . |
| 4,453,905 | * | 6/1984 | Bennett . |
| 4,472,059 | * | 9/1984 | Klein et al. . |
| 4,564,063 | | 1/1986 | Tollar . |
| 4,637,790 | * | 1/1987 | Klein . |
| 4,659,230 | * | 4/1987 | Son et al. . |
| 4,802,140 | * | 1/1989 | Dowling . |
| 4,859,068 | * | 8/1989 | Sironi . |
| 5,310,320 | | 5/1994 | Timuska . |
| 5,637,331 | | 6/1997 | Lenk et al. . |
| 5,988,866 | * | 11/1999 | Barr . |

FOREIGN PATENT DOCUMENTS

| | | |
|---|---|---|
| 2 040 918 | 2/1972 | (DE) . |
| 0 636 190 B1 | 2/1995 | (EP) . |

* cited by examiner

*Primary Examiner*—Tony G. Soohoo
(74) *Attorney, Agent, or Firm*—Alston & Bird LLP

(57) ABSTRACT

An apparatus for mixing and advancing a polymer melt, which includes a mixer and a conveying device. The mixer comprises a tubular mixing shaft (outer shaft) and an inner mixing shaft (inner shaft). The tubular outer shaft is arranged in surrounding relationship with the inner mixing shaft. Both mixing shafts extend in cantilever fashion into a mixing chamber, and a passageway is formed at the front end between the mixing chamber wall and the free end of the outer shaft, so that the mixing chamber is divided into an inner mixing chamber (inner chamber) and an outer mixing chamber (outer chamber), which are interconnected via the passageway. A melt inlet and a melt outlet are arranged in such a manner that the melt flow advances through the inner chamber and the outer chamber in opposite directions.

15 Claims, 6 Drawing Sheets

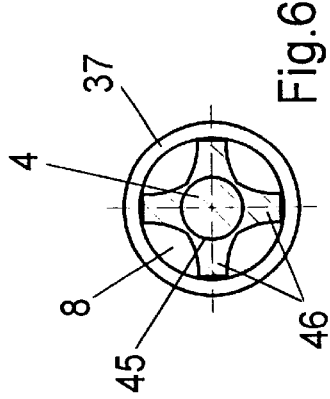
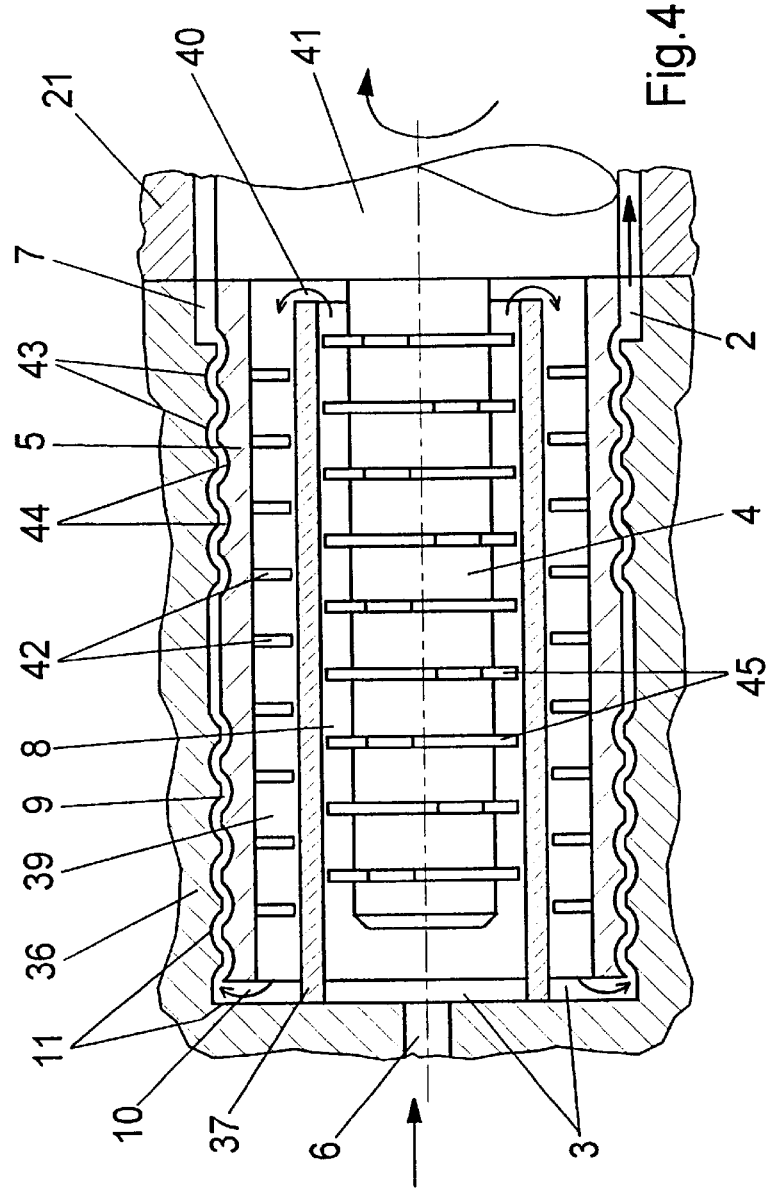

APPARATUS FOR MIXING AND ADVANCING A POLYMER MELT

CROSS-REFERENCE TO RELATED APPLICATIONS

This application is a continuation of PCT/EP99/06183, filed Aug. 23, 1999.

BACKGROUND OF THE INVENTION

The present invention relates to an apparatus for mixing and advancing a polymer melt.

In the processing of a thermoplastic material, the material is initially melted, for example, by an extruder and supplied as a polymer melt to further processing operations. To this end, the polymer melt is advanced by means of a conveying device. For further processing the polymer melt, the homogeneity of the melt constitutes an important criterion besides the dwelling time of the melt. To attain an adequately homogenized melt, the melt is therefore mixed by means of a mixer. In particular, in the case of high quality requirements when additives or fillers are incorporated, it is necessary to adapt to each other the melt throughput and the intensity of the mixing.

EP 0 636 190 and corresponding U.S. Pat. No. 5,637,331 disclose an apparatus, wherein the mixer is combined with a conveying device in one unit. In this unit, the mixing shaft of the mixer is driven together with the conveying device. In this connection, the rotational speed of the mixer is defined by the discharge of the conveying device, so that the mixing result is directly dependent on the conveying device. In the known apparatus, a main flow of the polymer melt is mixed in a mixing chamber by means of a rotating mixing shaft, and subsequently divided by means of the conveying device into partial flows, and advanced to a spinneret. In this connection, it is especially important that the partial flows be uniformly homogenized, for purposes of attaining a uniform product quality in the subsequent processing, in this instance in a spinning line.

U.S. Pat. No. 4,128,342 discloses an apparatus wherein the mixer shaft of the mixer is arranged at the end of an extrusion screw and driven by same. In this arrangement, the rotational speed of the mixer shaft is determined by the rotational speed of the conveying device, in this instance an extrusion screw.

Thus, in the known apparatus, the mixing result is dependent on the speed of the mixer shaft and the length of the mixing chamber. To obtain an intensive mixing at relatively low rotational speeds, it is necessary to construct the mixer chamber and thus the mixer shaft very long in the case of large throughput quantities.

It is accordingly an object of the invention to design and construct an apparatus of the initially described type in such a manner as to ensure, despite low rotational speeds of the mixer shaft, an intensive mixing of the polymer melt and with the mixer being constructed as compactly as possible.

SUMMARY OF THE INVENTION

The above and other objects and advantages of the present invention are achieved by the provision of an apparatus for mixing a polymer melt which comprises a mixing chamber having an outer wall, an inner mixing shaft mounted within said mixing chamber so as to define a central axis, and a tubular outer mixing shaft mounted coaxially about said inner shaft. The outer mixing shaft is radially spaced from the inner mixing shaft so as to define an inner mixing chamber therebetween, and the outer mixing shaft is radially spaced from the outer wall so as to define an outer mixing chamber therebetween. A free end of said outer mixing shaft is spaced from the outer wall of the mixing chamber so as to define a passageway therebetween which interconnects the inner mixing chamber with the outer mixing chamber. A drive is provided for rotatably driving the outer mixing shaft about the central axis, and the mixing chamber further has a melt inlet and a melt outlet, with one of the melt inlet and the melt outlet communicating with the inner mixing chamber, and the other of the melt inlet and the melt outlet communicating with the outer mixing chamber.

The inner mixing shaft may be stationary, or it may be rotatably driven by a drive which is separate from the drive of the outer mixing shaft. In a further embodiment, a drive shaft is connected to both the inner mixing shaft and the outer mixing shaft, so that they rotate together in the same direction.

With the present invention, the mixing chamber includes both the inner mixing chamber (inner chamber) and the outer mixing chamber (outer chamber), through which the melt flows respectively in opposite directions of flow and undergoes in each a mixing by a mixing shaft. This makes it possible to realize an approximately doubled dwelling time of the polymer melt within the mixing chamber. Furthermore, the reversal of the melt flow prevents the formation of marginal zones with a less intensive mixing. In the outer marginal zone of the inner chamber, the polymer melt becomes an inner marginal zone of the outer chamber after reversing the flow. Thus, a very intensive mixing of the marginal zones occurs, whereby the polymer melt is uniformly homogenized. To this end, the polymer melt enters the inner chamber of the mixer through a melt inlet. In the inner chamber, the rotation of the inner mixing shaft (inner shaft) causes a thorough mixing of the polymer melt. At the end of the inner chamber opposite to the melt inlet, a passageway is formed at the end of the outer mixing shaft (outer shaft), which represents a boundary between the inner chamber and the outer chamber. The polymer melt flows from the inner chamber through the passageway into the outer chamber. In the outer chamber, the polymer melt undergoes a further mixing by the rotation of the outer shaft. The polymer melt leaves the outer chamber through a melt outlet that opens into the mixing chamber, preferably at the end of the mixing chamber opposite the inlet of the mixing chamber.

However, it is also possible to interchange the melt inlet and the melt outlet, so that the melt entering the mixing chamber is mixed first in the outer chamber and subsequently in the inner chamber.

This results in particular in the advantage over the state of the art, in that an intensive mixing is realized even with high throughput quantities and relatively low rotational speeds. The flow reversal of the polymer melt within the mixing chamber allows avoiding in particular radial temperature differences.

The mixer of the present invention permits a stationary arrangement of the inner shaft in the mixing chamber. With this arrangement, the rotating outer shaft that preferably mounts mixing elements, provides an adequate mixing.

Irrespective of the design of the mixing elements, which may be constructed, for example, as pins, spirals, or scoops, it is possible to drive the inner shaft and the outer shaft in the same direction of rotation or in opposite directions of rotation. With the use of mixing elements that have a conveying effect, it is recommended to operate the mixer shafts in the same direction.

As noted above, the inner mixing shaft and the outer mixing shaft may be mounted on a common drive shaft. It is thus possible to operate the mixer together with a conveying device.

According to an advantageous further development of the invention, the outer mixing shaft mounts a plurality of mixing elements, and the inner mixing shaft also mounts a plurality of mixing elements, which extend radially into the inner chamber. The inner chamber is thus especially suitable for uniformly mixing the polymer melt over the entire cross section of the mixing chamber. The special advantage lies in having the inner mixing chamber comprise a rotating chamber wall. Thus, it is possible to use for mixing the melt the rotation of the inner shaft and the rotation of the outer shaft, which each mount mixing elements extending into the mixing chamber.

The mixing elements of the inner shaft and the mixing elements of the outer shaft may intermesh in the inner mixing chamber, which is especially advantageous for realizing a very intensive mixing.

In a specific embodiment of the invention, a tube is slipped over the inner shaft in such a manner that the inner chamber forms between the inner shaft and the tube, and that an intermediate mixing chamber (intermediate chamber) forms between the outer shaft and the tube. At its free end, the tube defines a passageway for connecting the inner chamber to the intermediate chamber. Preferably, the passageway extends at the end of the inner chamber opposite to the melt inlet. This further development of the invention makes it possible to reverse the melt flow from the melt inlet to the melt outlet several times in its flow direction within the mixing chamber. The polymer melt flows successively through the nested sectional chambers of the mixing chamber. In this process, the flow direction of the polymer melt is oppositely directed in adjacent sectional chambers. For example, the melt enters the inner chamber at the clamped end of the tube and undergoes mixing by the mixing shaft within the inner chamber. The melt flows through the inner chamber and enters the intermediate chamber via, for example, the gaplike passageway that is formed between the free end of the tube and the outer wall of the mixing chamber. As the melt flows through the intermediate chamber in the opposite direction, it is mixed by the outer shaft. Subsequently, the melt exits from the intermediate chamber via the passageway formed at the end of the outer shaft to enter the outer chamber, where it undergoes a further mixing. After flowing through the outer chamber, the melts leaves the mixer via the melt outlet.

To realize a uniform mixing when the outer wall of the inner chamber is stationary, it is desirable to mount radially projecting mixing elements about the circumference of the inner shaft and which extend along substantially the full length of the inner chamber.

Advantageously, the mixing chamber can be extended in the shape of a pin by the mounted end of the tube, and the inner shaft extends substantially over the entire length of the tube. With that, it is advantageously possible to lengthen the mixing zone of the inner chamber.

To mix the polymer melt in the intermediate chamber, it is possible to construct the apparatus so that the outer shaft mounts a plurality of radially inwardly projecting mixing elements, which extend substantially along the intermediate chamber.

To realize a very compact construction of the mixer, it is preferred to form the intermediate chamber essentially as a plurality of groove-like recesses in the tube surface and a plurality of recesses in the inner jacket surface of the outer shaft. The recesses of the outer shaft and tube are arranged relative to one another such that—when viewed in the axial direction—the recesses of the one surface axially overlap in part the end regions of respectively two successively arranged recesses of the other surface, so that the melt advancing through the mixer constantly alternates in a sinusoidal path from the recesses of the one surface to the recesses of the other surface. In this connection, the oppositely directed relative movement of the two surfaces in the circumferential direction results in that the fillings of the individual recesses constantly improve in their composition, due to their partial transfer to two or more recesses of the other surface. With that, a very satisfactory mixing result is achieved.

In a further development of the invention, the outer chamber is likewise formed substantially by a plurality of groove-like recesses in the mixing chamber outer wall and a plurality of recesses in the outer jacket surface of the outer shaft. The recesses are arranged relative to one another such that the melt being under a high pressure alternately flows through the system of recesses in the outer shaft and in the mixing chamber outer wall, that it is mixed, and that it is again and again sheared and distributed along elevations, which define the recesses. This leads in the end to an extremely uniform distribution and incorporation of all constituents of the melt.

To impart to the polymer melt as little shearing energy as possible, it is proposed to construct the outer shaft with peripherally projecting mixing elements that extend substantially along the outer chamber. This permits mixing thermoplastics that are particularly critical to process.

If an extrusion screw is used as the conveying device, it is possible to construct the inner shaft or the outer shaft directly as an extension of the extrusion screw.

The mixer may be combined with a distributor pump. This embodiment is especially suited for dividing in spinning lines a main melt flow into a plurality of partial flows. The intensive mixing permits likewise in an advantageous manner an adequate incorporation of additives added to the main flow or of a secondary flow added to the main flow directly before dividing the flow.

To be able to operate the distributor pump and the mixer shafts as uniformly as possible, it is advantageous to utilize a multiple gear pump having a plurality of paired gears. In this connection, the paired gears of the multiple gear pump and the mixer shafts may be jointly driven by a common drive shaft.

The polymer mixing apparatus of the present invention is characterized by a very intensive mixing of the melt at a relatively low rotational speed of the mixing shafts. The reversal of the flow within the mixer further permits avoiding dead zones or stagnation corners.

BRIEF DESCRIPTION OF THE DRAWINGS

In the following description of the invention, some embodiments are described in more detail with reference to the attached drawings, in which:

FIGS. 4 and 5 show further embodiments of the mixer of the present invention;

FIG. 6 is a schematic, cross sectional view of the inner shaft of the embodiment of FIG. 4.

DETAILED DESCRIPTION OF THE PREFERRED EMBODIMENTS

Figure 1:
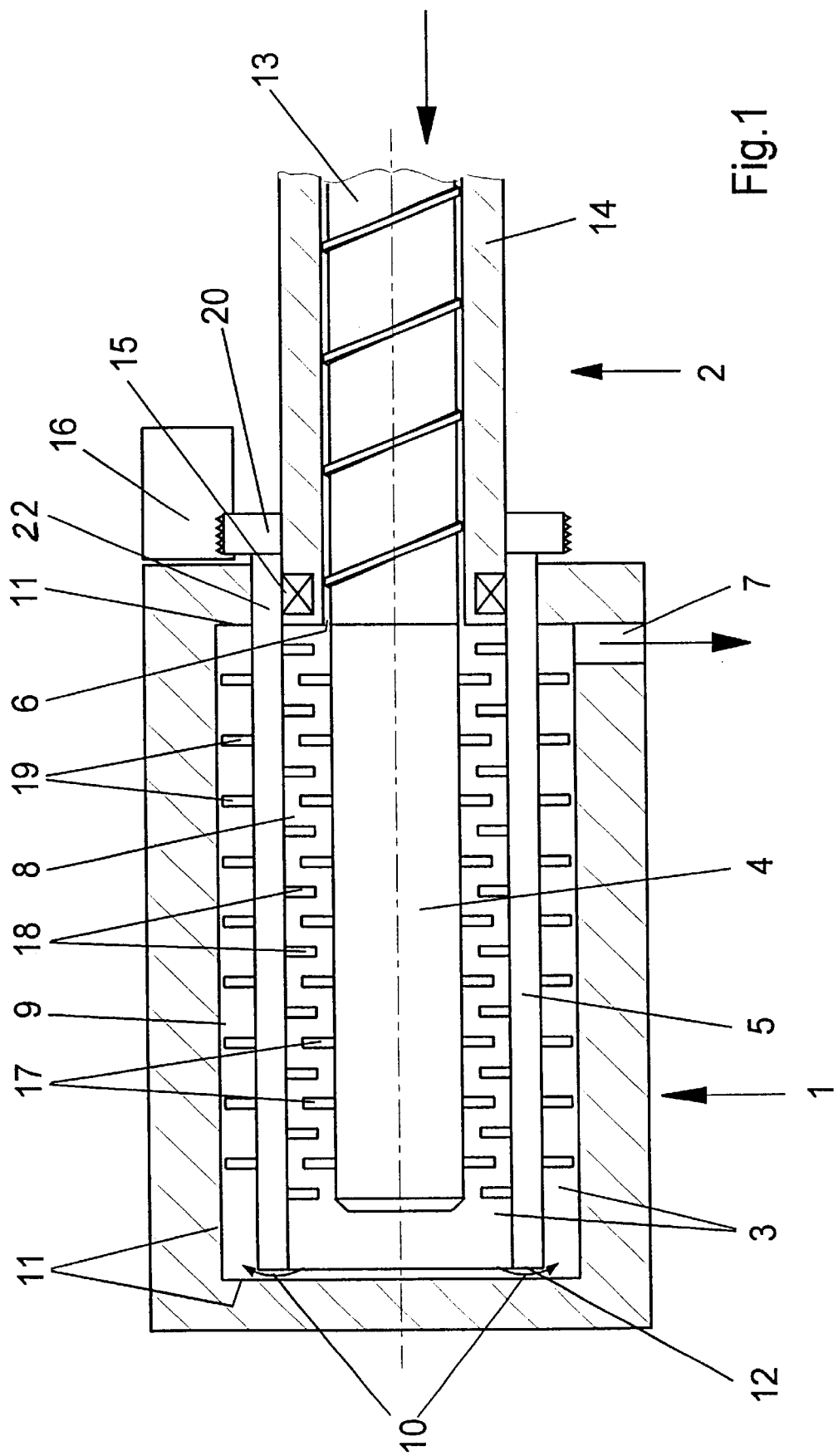
FIG. 1 is a sectional view of a first embodiment of the apparatus according to the invention.

FIG. 1 is a schematic sectional view of a first embodiment of the apparatus according to the invention. The apparatus comprises a mixer 1 and a conveying device 2. The conveying device 2 includes an extrusion screw 13 that rotates inside a barrel 14. FIG. 1 shows the extrusion screw 13 with its discharge section at the end of barrel 14. In this section, the extrusion screw 13 has a continuously extending spiral for discharging the melt from the barrel and building up a constant pressure. Adjacent the end of the barrel is a mixing chamber 3. In this arrangement, the barrel 14 terminates with its one end in the mixing chamber 3 and thus forms a melt inlet 6. The free end of extrusion screw 13 mounts in its axial extension an inner mixing shaft 4. The inner shaft 4 is driven by the extrusion screw 13 and its drive.

On its circumference, the inner shaft 4 mounts a plurality of radially projecting mixing elements 17. The mixing elements 17 are evenly distributed over the circumference of the inner shaft 4. The mixing elements 17 may be formed, for example, by pins, cams, or scoops.

Inside the mixing chamber 3, a hollow cylindrical outer mixing shaft 5 extends in substantially concentric relationship with inner shaft 4. At its one end 22, the outer shaft 5 is rotatably supported in a mixing chamber outer wall 11 and the jacket of barrel 14 respectively. To this end, a bearing 15 is provided. The shaft end 22 mounts a gear wheel 20, which meshes with a drive 16 for driving the outer shaft 5. The outer shaft 5 extends into the mixing chamber 3 in such a manner that an annular passageway 10 is formed between the shaft end 12 and mixing chamber wall 11. This divides the mixing chamber 3 into an inner chamber 8 that is formed between inner shaft 4 and outer shaft 5, and an outer chamber 9 that extends between the outer shaft 5 and mixing chamber wall 11. The inner chamber 8 and outer chamber 9 are interconnected by the passageway 10. On its outer surface, the outer shaft 5 mounts a plurality of radially projecting mixing elements 19 and likewise a plurality of mixing elements 18 in its interior. The mixing elements 18 of outer shaft 5 and the mixing elements 17 of inner shaft 4 project offset from one another into the inner chamber 8 and intermesh. The mixing elements 18 and 19 of the outer shaft may be formed, for example, by pins, cams, or scoops.

On the side of mixing chamber 3 opposite to the passageway 10, a melt outlet 7 is arranged in mixing chamber outer wall 11.

In the apparatus shown in FIG. 1, the extrusion screw 13 advances a polymer melt from barrel 14, via melt inlet 6, into the inner chamber 8 of mixer 1. The inner shaft 4 rotates in the same direction at the same rotational speed as the extrusion screw 13. The outer shaft 5 is driven by drive 16. It is possible to drive the outer shaft 5 in the same direction as inner shaft 4 or in the opposite direction to inner shaft 4. In both cases, the polymer melt is mixed in inner chamber 8 by the mixing elements 17 of inner shaft 4 and the mixing elements 18 of outer shaft 5. The discharge pressure causes the polymer melt to flow in the axial direction right to the end of inner chamber 8. At the end of inner chamber 8, the polymer melt enters the adjacent outer chamber 9 through passageway 10. The polymer melt now flows through outer chamber 9 in the axially opposite direction. In this process, the polymer melt undergoes further mixing by mixing elements 19 on the circumference of outer shaft 5. At the end of outer chamber 9, the polymer melt exits through melt outlet 7.

In the apparatus shown in FIG. 1, the conveying device precedes the mixer. This arrangement is thus especially suited for mixing the polymer melt directly after its melting by an extruder.

Figure 2:
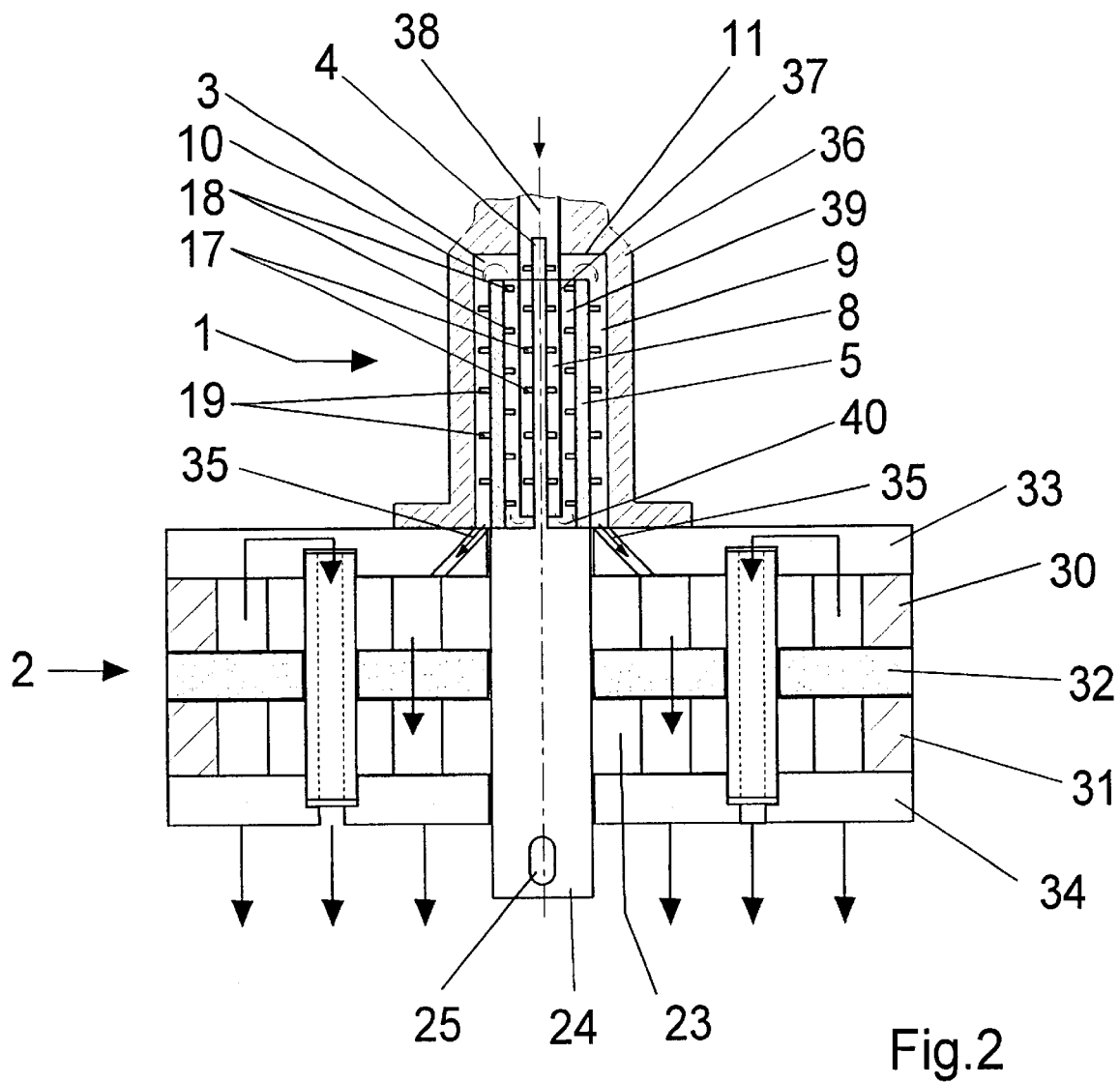
FIG. 2 is a sectional view of a further embodiment of the apparatus according to the invention.
Figure 3:
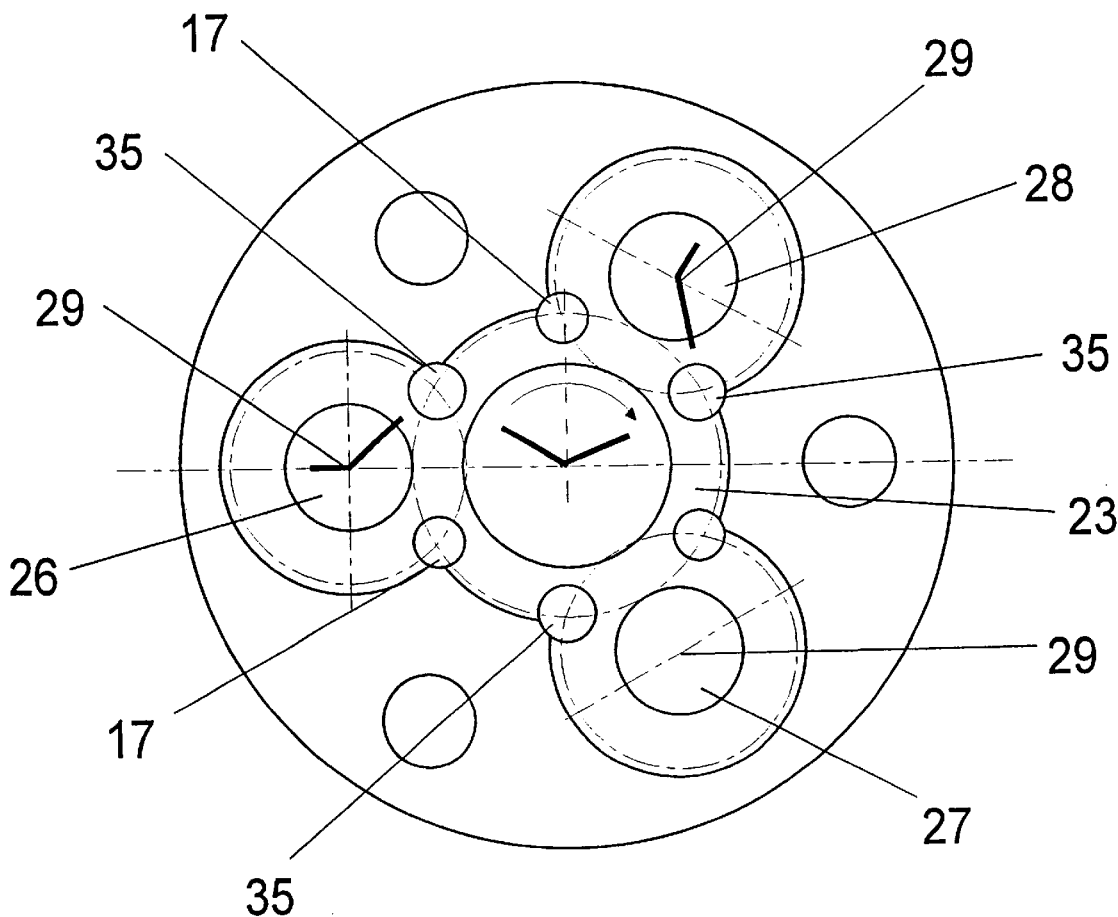
FIG. 3 is a schematic top view of the embodiment of FIG. 2.

FIGS. 2 and 3 illustrate a further embodiment of an apparatus according to the invention, wherein the conveying device 2 follows the mixer 1. FIG. 2 is a schematic, sectional view of the apparatus, and FIG. 3 a schematic top view of the apparatus. Thus, the following description applies to FIGS. 2 and 3.

In this instance, the conveying device 2 is a distributor pump. The illustrated distributor pump is a gear pump with a sun gear 23. The sun gear 23 is driven by a common drive shaft 24. The drive side is identifiable by a keyway 25. The sun gear 23 meshes with three planetary gears 26, 27, and 28. The planetary gears extend over the circumference, each 120° out of phase. The planetary gears are mounted for free rotation on pins 29. This results in three gear pairings each with the sun gear 23 and one of the planetary gears 26, 27, and 28. Each of these gear pairings forms an individual pump.

Thus, the conveying device shown in FIG. 2 is a sextuple pump, inasmuch as the common drive shaft 24 also drives a second set of gears, likewise consisting of sun gear 23 as well as planetary gears 26, 27, and 28. For the sake of clarity, it should be remarked that corresponding gears of both gear sets are coaxially supported. The two gear sets are guided by housing plates 30 and 31. These housing plates 30 and 31 comprise cutouts, each of which accommodates the sun gear and the planetary gears. The gear sets are separated from each other by an intermediate plate 32. The pump sets are closed at their respectively other front ends by cover plates 33 and 34.

Opposite to the drive side of the pump, the cover plate accommodates inlet channels 35. The inlet channels 35 connect to the outer chamber 9 of mixer 1. To this end, the mixer is flanged with its housing 36 to the cover plate 33. In the housing 36, the mixing chamber 3 is in alignment with the drive shaft 24. The end of the drive shaft 24 which is opposite the drive side mounts an inner shaft 4 and an outer shaft 5. Thus, the drive shaft extends with inner shaft 4 and outer shaft 5 into the mixing chamber 3. On the end adjacent the free ends of mixer shafts 4 and 5, a tube 37 is arranged in the center of mixing chamber wall 11. With its one free end, the tube 37 extends into the mixing chamber 3, the tube 37 enclosing the inner shaft 4. The tube 37 forms an inner chamber 8. At the free end of tube 37, inside the mixing chamber 3, a passageway 40 extends, which interconnects the inner chamber 8 and an intermediate chamber 39 that extends between the tube 37 and the outer shaft 5. The intermediate chamber 39 connects again to the outer chamber 9 via a passageway 10 formed at the free end of outer shaft 5. The outer chamber 9 itself connects at the flange end of housing 36 to the inlet channels 35 of the distributor pump.

In the embodiment of the apparatus according to the invention as shown in FIG. 2, a melt flow enters the inner chamber 8 of mixer 1 through a central inlet channel 38. The circumference of inner shaft 4 mounts a plurality of mixing elements 17 that radially project therefrom, so that the polymer melt is mixed within inner chamber 8 during the rotation of inner shaft 4. In this process, the inner shaft 4 and outer shaft 5 are driven by the common drive shaft 24. After the melt has axially advanced through the inner chamber 8, it enters adjacent intermediate chamber 39 through passageway 40 at the free end of tube 37. The melt flows through intermediate chamber 39 in the axial direction opposite to the direction of flow in inner chamber 8. A plurality of mixing elements 18 mounted to the inside wall of outer shaft 5 extend through intermediate chamber 39. At the free end of outer shaft 5, the melt enters adjacent outer chamber 9 through the passageway 10. A mixing occurs in outer chamber 9 by means of the mixing elements 19 arranged on the circumference of outer shaft 5, until the polymer melt reaches at the end of outer chamber 9 the inlet channels 35 of the distributor pump. In the distributor pump, the melt flow is divided by the individual pumps into a total of six partial flows, and each flow is delivered to a spinneret.

In the arrangement shown in FIG. 2, the inner shaft is constructed such that for lengthening the mixing chamber, its free end extends into the central inlet channel 38.

In this embodiment, an intensive mixing of the main flow is effected directly before it is divided into partial flows. In this process, all cross sectional areas of the main flow are intermixed. With that, it is accomplished, that all partial flows are homogeneous not only in themselves, but also among one another, and exhibit a uniform temperature and viscosity. Preferably, such apparatus are used in spinning lines, wherein a thermoplastic material is melted by an extruder and delivered under pressure to the distributor pump.

Figure 5:
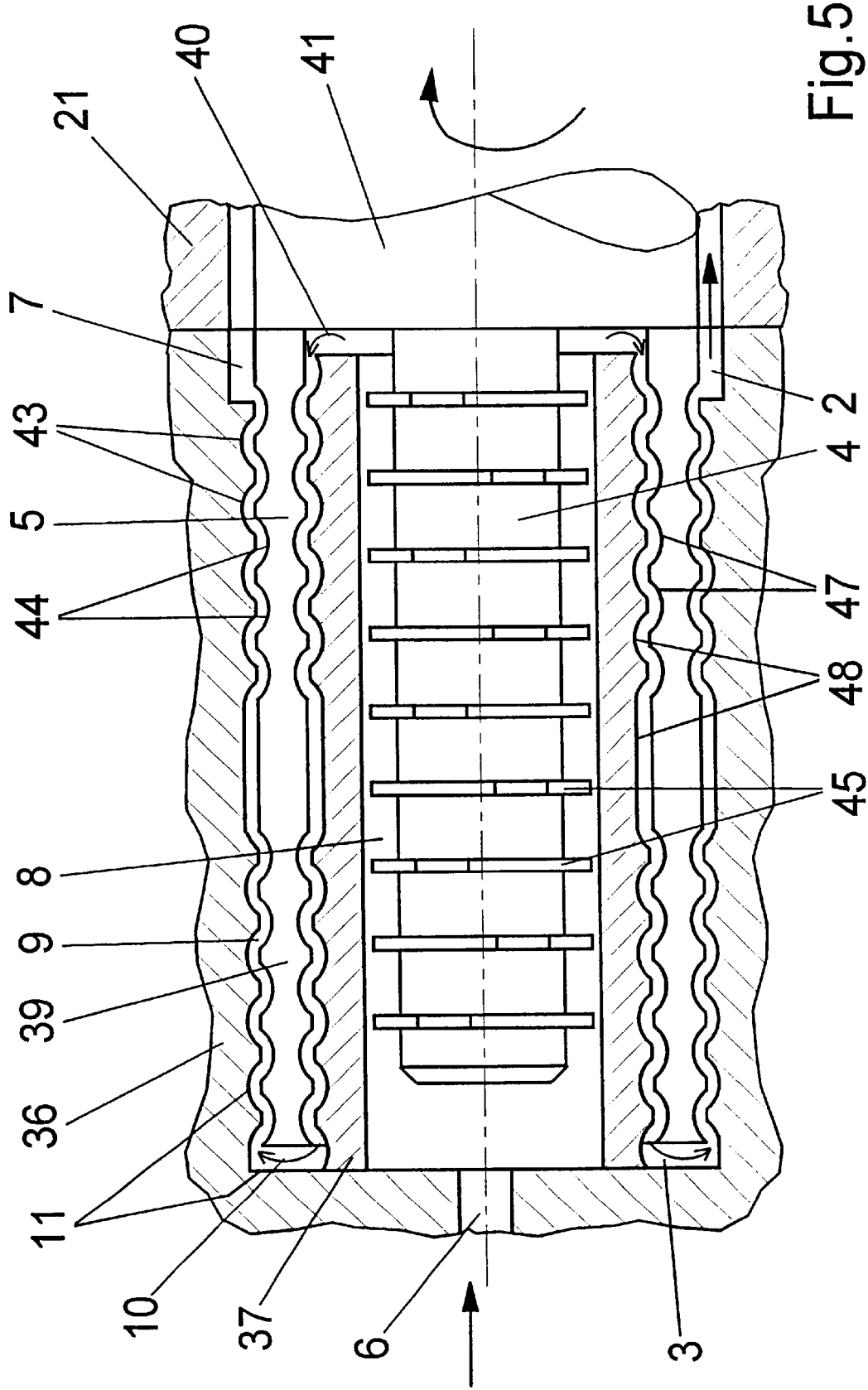

FIGS. 4 and 5 illustrate further embodiments of mixers, as could be used in an apparatus of FIG. 1 or in an apparatus of FIG. 2. For a better overview, structural parts of the same function are also identified by identical numerals. In the following, FIGS. 4 and 5 are jointly described, unless otherwise specified.

A housing 36 accommodates the mixing chamber 3. The housing 36 connects to a bearing part 21, which seals the mixing chamber 3 toward the outside. A drive shaft 41 is supported in the bearing part 21. The free end of drive shaft 41 coaxially mounts the inner shaft 4 and in concentric relationship therewith the outer shaft 5. The inner shaft 4 and outer shaft 5 extend into mixing chamber 3. At the front end of the mixing chamber 3 opposite to the bearing part, a tube 37 is attached to the mixing chamber wall 11. The tube 37 extends into an annular space formed between the inner shaft 4 and the outer shaft 5. At the free end of tube 37, a passageway 40 is formed in mixing chamber 3. The passageway 40 interconnects the inner chamber 8 formed between tube 37 and inner shaft 4 and the intermediate chamber 39 formed between outer shaft 5 and tube 37. At the free end of outer shaft 5, a passageway 10 is provided, which connects the intermediate chamber 39 to the outer chamber 9. The mixing chamber 3 comprises a melt inlet 6 and a melt outlet 7. The melt inlet 6 ends in inner chamber 8. The melt outlet 7 connects to the outer chamber 9.

The circumference of inner shaft 4 mounts a plurality of parallel, successively arranged mixing rims 45, which radially project and substantially extend through the inner chamber 8 up to the inside diameter of tube 37. FIG. 6 is a cross sectional view of inner chamber 8. The inner shaft 4 is arranged with mixing rim 45 free of play for rotation in tube 37. Each mixing rim 45 consists of a plurality of mixing elements 46 arranged on one plane on the circumference of the inner shaft. The mixing elements extend through inner chamber 8 in the radial direction, so that during the rotation of the inner shaft, a thorough mixing occurs in inner chamber 8 that is essentially formed by the annular space between the tube 37 and inner shaft 4. The gear rims 45 are arranged on the circumference of inner shaft 4 in such a manner that the mixing elements 46 of adjacent mixing rims are arranged offset from one another in the axial direction.

In the embodiment of the mixer shown in FIG. 4, the inner jacket surface of outer shaft 5 mounts a plurality of pins 42 in such a manner that they substantially extend through intermediate chamber 39 in the radial direction. The pins 42 are likewise arranged offset from one another in the axial direction.

In the embodiments of FIGS. 4 and 5, the outer chamber 9 is formed by a plurality of recesses 43 in mixing chamber wall 11 and a plurality of recesses 44 in the outer jacket surface of outer shaft 5. Preferably, the recesses 43 and 44 are designed and constructed as axis parallel grooves. The grooves are distributed in axially lined-up areas with limited length extension, each regularly distributed over the respective circumference, and arranged in axial direction such that the recesses 44 in the surface of the outer shaft 5 and the recesses 43 in mixing chamber wall 11 partially overlap in their end regions. A narrow gap is formed between the outside diameter of outer shaft 5 and the inside diameter of mixing chamber 3. Thus, inside the outer chamber 9, the polymer melt is alternately forced from one recess into the opposite recess, and vice versa.

In the embodiment of the mixer shown in FIG. 5, the intermediate chamber 39 is formed in like manner by a plurality of recesses 47 in the jacket surface of outer shaft 5 and therewith cooperating recesses 48 in the jacket of tube 37. In this arrangement, the melt flow is guided in intermediate chamber 39 alternately from one recess into the opposite recess, and vice versa.

In the embodiments shown in FIGS. 4 and 5, the polymer melt enters inner chamber 8 under pressure through melt inlet 6. Before the polymer leaves the mixing chamber through melt outlet 7, it is successively mixed in inner chamber 8, intermediate chamber 39, and outer chamber 9. In this process, the mixer shafts 4 and 5 are driven by drive shaft 41 in the same direction. Basically, it is also possible in the embodiments of FIGS. 4 and 5 to interchange the melt inlet and melt outlet, so that the melt flow ends in outer chamber 9, when it enters the mixer.

Figure 7:
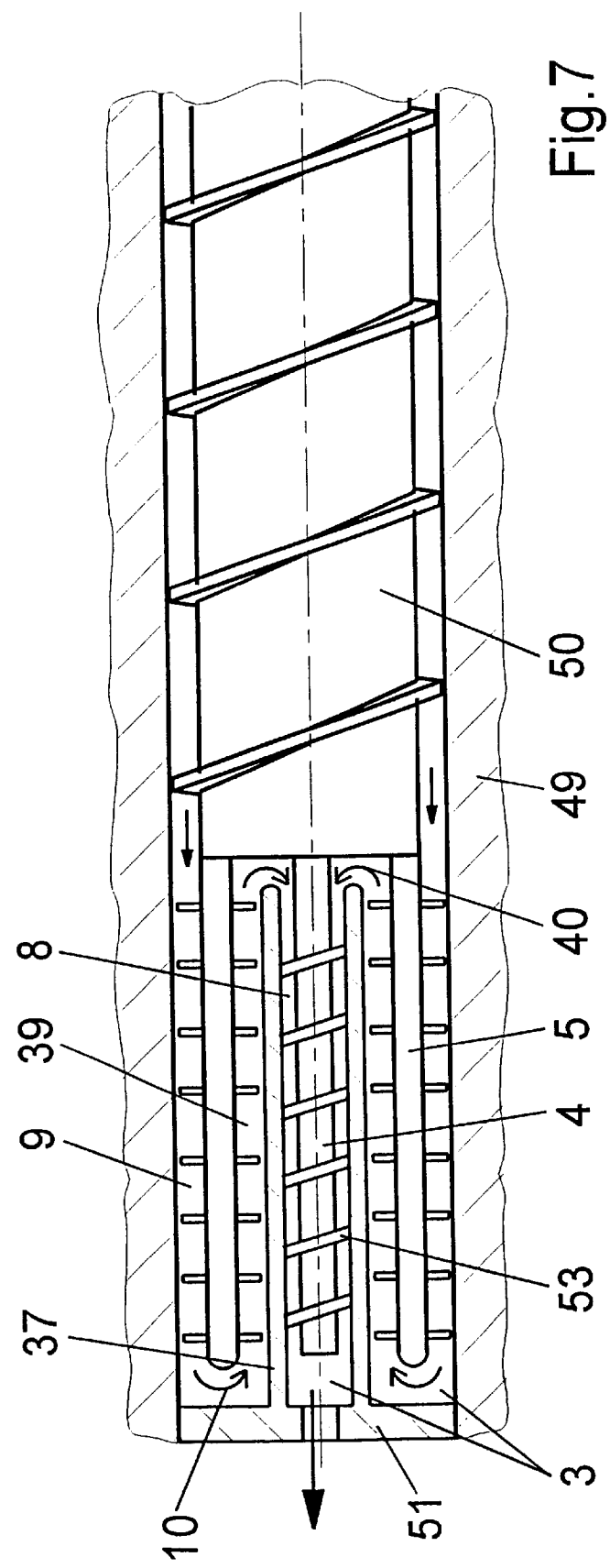
FIG. 7 is sectional view of a further embodiment of the apparatus of the present invention.

FIG. 7 illustrates a further embodiment of an apparatus according to the invention. In this embodiment, the mixer chamber 3 is formed at the end of a barrel 49. In the barrel 49, an extrusion screw 50 is supported for rotation. At its end, the extrusion screw 50 connects to the inner shaft 4 and outer shaft 5. The outer shaft 5 and inner shaft 4 project in cantilever fashion into the mixing chamber 3. Opposite to the free shaft ends, a cover 51 is sealingly arranged in barrel 49. The front end of cover 51 facing the mixing chamber 3 mounts a tube 37. As previously described, the outer shaft 5, tube 37, and inner shaft 4 are arranged relative to one another such that they form an outer chamber 9, an intermediate chamber 39, and an inner chamber 8. The outer chamber connects via the passage 10 to the intermediate chamber 39. The intermediate chamber 39 connects via passageway 40 to the inner chamber 8. In this embodiment, the outer shaft mounts respectively internal and external mixing elements 18 and 19. The inner shaft 4 is equipped with a spiral 53.

The polymer melt that is advanced by extrusion screw 50, is discharged from the barrel 49 into the axially adjacent outer chamber 9. After the melt has successively advanced, for purposes of being mixed, through outer chamber 9, intermediate chamber 39, and inner chamber 8 in axially opposite flow directions, it leaves inner chamber 8 through melt outlet 7 arranged in the center of cover 51.

In the apparatus shown in FIG. 7, it is also possible to arrange a spiral respectively on the circumference of inner shaft 4 and on the inside diameter of outer shaft 5. This permits advancing the polymer melt through the intermediate chamber and the inner chamber. Such a construction has the advantage that no greater pressure losses are incurred in particular in a combination with an extrusion screw.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. An apparatus for mixing a polymer melt comprising
   a mixing chamber having an outer wall,
   an inner mixing shaft mounted within said mixing chamber so as to define a central axis,
   a tubular outer mixing shaft mounted coaxially about said inner mixing shaft, with said outer mixing shaft being radially spaced from said inner mixing shaft so as to define an inner mixing chamber therebetween, with said outer mixing shaft being radially spaced from said outer wall so as to define an outer mixing chamber therebetween, and with a free end of said outer mixing shaft being spaced from the outer wall of the mixing chamber so as to define a passageway therebetween which directly interconnects the inner mixing chamber with the outer mixing chamber,
   a drive for rotatably driving said outer mixing shaft about said central axis,
   said mixing chamber further having a melt inlet and a melt outlet, with one of said melt inlet and said melt outlet communicating with said inner mixing chamber, and the other of said melt inlet and said melt outlet communicating with said outer mixing chamber.

2. The mixing apparatus as defined in claim 1 further comprising a rotatably driven drive shaft which coaxially mounts said inner mixing shaft, and such that the inner and outer mixing shafts are separately driven.

3. The mixing apparatus as defined in claim 2 wherein the melt inlet communicates with said inner mixing chamber, and wherein said rotatably driven drive shaft comprises an extrusion screw which is mounted in a barrel and communicates with said melt inlet.

4. The mixing apparatus as defined in claim 1 wherein said melt inlet and said melt outlet are both located adjacent the ends of the inner and outer mixing shafts which are opposite said passageway.

5. The mixing apparatus as defined in claim 1 wherein said drive further includes a conveying device for conveying a polymer melt to said melt inlet.

6. The mixing apparatus as defined in claim 1 wherein said inner mixing shaft mounts a plurality of first mixing elements which extend radially into said inner mixing chamber, and wherein said outer mixing shaft mounts a plurality of second mixing elements on its inside surface which extend radially into said inner mixing chamber, and wherein the first and second mixing elements intermesh.

7. The mixing apparatus as defined in claim 6 wherein said outer mixing shaft mounts a plurality of mixing elements on its outside surface which extend radially into said outer mixing chamber.

8. An apparatus for mixing a polymer melt comprising
   a mixing chamber having an outer wall,
   an inner mixing shaft mounted within said mixing chamber and coaxially to one end of a rotatable drive shaft,
   a tube fixedly mounted within said mixing chamber so as to coaxially surround said inner mixing shaft in a spaced apart arrangement and so as to define an inner mixing chamber therebetween,
   a tubular outer mixing shaft mounted within said mixing chamber and coaxially to said one end of said drive shaft and so as to surround said tube in a radially spaced apart arrangement and so as to define an intermediate mixing chamber therebetween, and with said outer mixing shaft being radially spaced from said outer wall of said mixing chamber so as to define an outer mixing chamber therebetween,
   said tube having a free end spaced from said one end of said drive shaft so as to define a passageway therebetween which interconnects said inner mixing chamber and said intermediate mixing chamber,
   said outer mixing shaft having a free end which is spaced from said outer wall of said mixing chamber so as to define a passageway therebetween which interconnects said intermediate mixing chamber with said outer mixing chamber,
   said mixing chamber further having a melt inlet and a melt outlet, with one of said melt inlet and said melt outlet communicating with said inner mixing space, and the other of said melt inlet and said melt outlet communicating with said outer mixing space, and
   a drive for rotating said drive shaft to concurrently rotate the inner mixing shaft and the outer mixing shaft.

9. The mixing apparatus as defined in claim 8 wherein said inner mixing shaft mounts a plurality of mixing elements about its circumference and which extend radially into said inner mixing chamber, and wherein said outer mixing shaft mounts a plurality of mixing elements about its circumference and which extend radially into said intermediate mixing chamber.

10. The mixing apparatus as defined in claim 8 wherein said tube has an outer surface which includes a plurality of axially spaced apart circumferential recesses, and wherein said outer mixing shaft has an inner surface which includes a plurality of axially spaced apart circumferential recesses, and with the recesses of the tube and the recesses of the outer mixing shaft being arranged relative to one another so as to define a generally sinusoidal path when viewed in axial cross section.

11. The mixing apparatus as defined in claim 10 wherein said outer mixing shaft has an outer surface which includes a plurality of axially spaced apart circumferential recesses, and wherein said outer wall of said mixing chamber has a generally cylindrical inner surface which includes a plurality of axially spaced apart circumferential recesses, and with the recesses of the outer surface of the outer mixing shaft and the recesses of the inner surface of the outer wall being arranged relative to one another so as to define a generally sinusoidal path when viewed in axial cross section.

12. The mixing apparatus as defined in claim 8 wherein said melt inlet and said melt outlet are located adjacent respective opposite ends of the inner mixing shaft and the outer mixing shaft.

13. The mixing apparatus as defined in claim 8 wherein the melt inlet communicates with said outer mixing chamber, and wherein the drive shaft comprises an extrusion screw which is mounted in a barrel and which communicates with said melt inlet.

14. The mixing apparatus as defined in claim 8 wherein the melt outlet communicates with said outlet mixing chamber, and further comprising a distributor pump connected to the melt outlet.

15. The mixing apparatus as defined in claim 14 wherein the distributor pump comprises a multiple gear pump having a plurality of paired gears, and wherein the paired gears are drivingly connected to said drive shaft.

\* \* \* \* \*